(12) United States Patent
Gopisetty et al.

(10) Patent No.: US 7,526,540 B2
(45) Date of Patent: Apr. 28, 2009

(54) SYSTEM AND METHOD FOR ASSIGNING DATA COLLECTION AGENTS TO STORAGE AREA NETWORK NODES IN A STORAGE AREA NETWORK RESOURCE MANAGEMENT SYSTEM

(75) Inventors: Sandeep Kumar Gopisetty, Morgan Hill, CA (US); David Lynn Merbach, Rochester, MN (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/421,220

(22) Filed: Apr. 22, 2003

(65) Prior Publication Data

US 2004/0215904 A1 Oct. 28, 2004

(51) Int. Cl.
G06F 15/173 (2006.01)
(52) U.S. Cl. ...................................... 709/223; 709/224
(58) Field of Classification Search .................. 709/223, 709/224; 718/105; 455/453; 715/734, 735, 715/736
See application file for complete search history.

(56) References Cited

U.S. PATENT DOCUMENTS

| | | | | |
|---|---|---|---|---|
| 5,282,147 A * | 1/1994 | Goetz et al. | ...................... | 716/2 |
| 5,587,922 A * | 12/1996 | Hendrickson et al. | .......... | 716/2 |
| 5,652,751 A * | 7/1997 | Sharony | ...................... | 370/227 |
| 6,047,331 A * | 4/2000 | Medard et al. | ............... | 709/239 |
| 6,128,628 A | 10/2000 | Waclawski et al. | .......... | 707/203 |
| 6,182,085 B1 * | 1/2001 | Eichstaedt et al. | ........ | 707/104.1 |
| 6,331,905 B1 * | 12/2001 | Ellinas et al. | ................... | 398/2 |
| 6,367,037 B1 | 4/2002 | Remer et al. | ................... | 714/47 |
| 6,437,804 B1 * | 8/2002 | Ibe et al. | ...................... | 715/736 |
| 6,631,421 B1 * | 10/2003 | Steele et al. | ................. | 709/249 |
| 6,711,171 B1 * | 3/2004 | Dobbins et al. | ............. | 370/400 |
| 7,075,536 B1 * | 7/2006 | Goldschmidt | ............... | 345/440 |
| 2002/0089934 A1 * | 7/2002 | Sokhin et al. | ................ | 370/237 |
| 2002/0169734 A1 | 11/2002 | Giel et al. | ...................... | 706/45 |
| 2004/0103194 A1 * | 5/2004 | Islam et al. | ................. | 709/225 |
| 2005/0010682 A1 * | 1/2005 | Amir et al. | ................... | 709/238 |

FOREIGN PATENT DOCUMENTS

WO WO 01/42988 A2 6/2001

* cited by examiner

Primary Examiner—Larry D Donaghue
Assistant Examiner—Brian J Gillis
(74) Attorney, Agent, or Firm—Cantor Colburn LLP; Van Nguy

(57) ABSTRACT

Data collection agents are assigned to storage area network nodes in a storage area network resource management system, such that the bandwidth and cost of data collection are equitably distributed among data collection agents. Data collection overlaps and load imbalances are eliminated across the data collection agents, creating approximately equal partitions of bandwidth and data collection for each data collection agent. Graph partitioning is used to accomplish load balancing. The assignment of data collection agents to storage area network nodes equitably distributes the bandwidth and processing costs among the data collection agents and ensures a load balance.

5 Claims, 4 Drawing Sheets

SYSTEM AND METHOD FOR ASSIGNING DATA COLLECTION AGENTS TO STORAGE AREA NETWORK NODES IN A STORAGE AREA NETWORK RESOURCE MANAGEMENT SYSTEM

FIELD OF THE INVENTION

The present invention generally relates to storage area networks, and more particularly to assigning data collection agents to storage area network nodes in a storage area network resource management system, such that the bandwidth and processing cost of data collection is distributed among data collection agents.

BACKGROUND OF THE INVENTION

A storage area network comprises host applications servers connected to storage devices via a network fabric. Storage area networks decouple storage from application service and allow storage to be expanded and managed independent of the application servers. To assist system administrators in the task of managing storage, a storage area network system allows the administrator to collect information from the nodes in the storage area network, which generate reports about the performance and attributes of the storage area network, and analyze historical data about the storage area network to reveal trends.

A key parameter in the performance of a storage area network resource management system is the efficient collection of information from the nodes in the storage area network. The storage area network resource management system places data collection agents in every application server whose role is to obtain information about the nodes.

A simplistic approach would require every data collection agent to obtain information about every visible node in the storage area network. However, this approach is inefficient since the nodes are shared between application servers, and data collection agents would be required to collect significant redundant information. Such redundant information could consume critical network bandwidth in the storage area network and overwhelm the storage area network resource management server.

An efficient storage area network resource management system should provide an assignment of data collection agents to storage area network nodes. This assignment would allow data collection agents to collect information only from the assigned storage area network nodes and relay the information to the storage area network resource management server. Consequently, the amount of collected information would be minimized and the bandwidth and processing costs reduced.

Furthermore, the assignment of data collection agents to storage area network nodes should be load-balanced. If the load is disproportionately distributed between the data collection agents, the efficiency of the storage area network resource management system will be limited by the performance of the data collection agents with the largest number of assignments. Consequently, the assignment of data collection agents to storage area network nodes should be equitably distributed.

However, the assignment of data collection agents to storage area network nodes should also consider the consequences of failure of both data collection agents and storage area network nodes. For example, if a data collection agent fails, there should be provided a backup data collection agent to collect information from the storage area network nodes assigned to the failed data collection agent. Similarly, if a data collection agent fails to collect information from a storage area network node, a second data collection agent should be able to confirm the failure of the storage area network node.

The assignment problem of data collection agents to storage area network nodes should be reduced to the maximal set cover problem in graphs. The storage area network could be represented as a graph with the storage area network nodes and data collection agents being the vertices. The connectivity between the storage area network nodes and the data collection agents determine the edges in the graph. The goal is to find a maximal collection of data collection agents vertices that can cover all the storage area network node vertices in the graph. However, the maximal set cover problem is difficult to evaluate, and thus an approximation should be used. Moreover, the constraints of load balancing and fail-over add further complexity to any approximation algorithm used.

One approach to this problem is to assign a storage area network node to the data collection agent with the lowest number of assignments and then continue the process until all assignments are completed. Since the first set of assignments has no guarantee of a load balance, this algorithm would employ successive iterations with a convergence criterion until an acceptable solution is found. However, this approach does not provide a solution to the fail-over requirement and may be polynomial in complexity if the convergence for load balancing is not sub-linear.

What is therefore needed is a system and an associated method for assigning data collection agents to storage area network nodes that will ensure load balancing, and that handle failure of both data collection agents and storage area network nodes. The need for such a system and method has heretofore remained unsatisfied.

SUMMARY OF THE INVENTION

The present invention satisfies this need, and presents a system, a computer program product, and an associated method (collectively referred to herein as "the system" or "the present system") for assigning data collection agents to storage area network nodes in a storage area network resource management system, such that bandwidth and cost of data collection are distributed among data collection agents. The present system significantly reduces if not eliminates data collection overlaps and load imbalances across the data collection agents, creating approximately equal partitions of bandwidth and data collection for each data collection agent.

The present system uses graph partitioning to accomplish load balancing. The assignment of data collection agents to storage area network nodes by the present system equitably distributes the bandwidth and processing costs among the agents and ensures a load balance. In addition, the present system provides mutually exclusive sets of data collection agents to storage area network nodes that can be used in the event of failure of a data collection agent or storage area network node.

This fail-over protection ensures that if one host or data collection agent fails, one or more of the remaining hosts or data collection agents can assume the load of the failed host or data collection agent. The present system repeats the partitioning or load balancing of the storage area network, thus load balancing the entire environment.

The present system is based on the class of multi-constraint graph partitioning solutions as used, for example, in computer aided design, parallel processing, and seismology. The present system uses a graph partitioning solution that is tailored to the constraints in the storage area network resource management domain.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
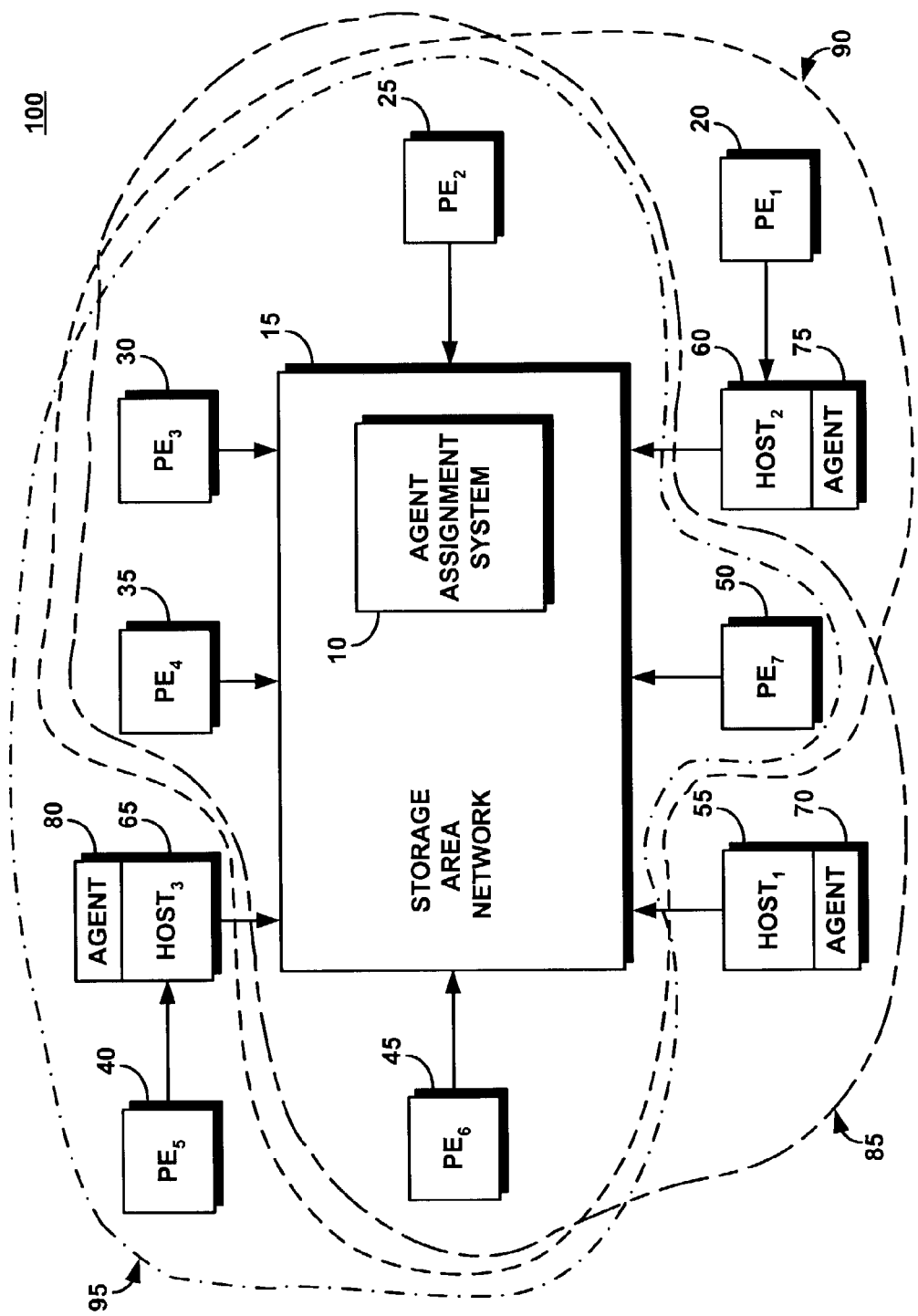
FIG. 1 is a schematic illustration of an exemplary operating environment in which a data collection agent assignment system of the present invention can be used.

FIG. 1 portrays an exemplary overall environment in which a system 10 and an associated method 300 (FIG. 3) for assigning data collection agents to storage area network nodes in a storage area network resource management system according to the present invention may be used. The storage area network management system 100 comprises a data collection agent assignment system 10 as part of a storage area network 15. System 10 includes a software programming code or computer program product that is typically embedded within, or installed on a computer. Alternatively, system 10 can be saved on a suitable storage medium such as a diskette, a CD, a hard drive, or like devices.

The storage area network 15 comprises storage systems that serve numerous hosts; these storage systems are also referred to herein as physical entities, or PEs. These physical entities, represented as $PE_1$ 20, $PE_2$ 25, $PE_3$ 30, $PE_4$ 35, $PE_5$ 40, $PE_6$ 45, and $PE_7$ 50, collect information that is accessed by the storage area network 15 through hosts such as $host_1$ 55, $host_2$ 60, and $host_3$ 65. Data collection agents, such as data collection agents 70, 75, 80 reside on hosts such as $host_1$ 55, $host_2$ 60, and $host_3$ 65, respectively.

The connectivity between hosts and physical entities may be represented by a switch fabric and arbitrated loops. The arbitrated loops for each host comprises the host and every physical entity that the host can access. For example, $host_1$ 55 can access $PE_2$ 25, $PE_3$ 30, $PE_4$ 35, $PE_6$ 45, and $PE_7$ 50, as shown by arbitrated loop 85. $Host_2$ 60 can access $PE_1$ 20, $PE_2$ 25, $PE_3$ 30, $PE_4$ 35, $PE_6$ 45, and $PE_7$ 50, as shown by arbitrated loop 90. $Host_3$ 65 can access $PE_2$ 25, $PE_3$ 30, $PE_4$ 35, $PE_5$ 40, $PE_6$ 45, and $PE_7$ 50, as indicated by arbitrated loop 95. It is possible for an arbitrated loop to have more than one host.

Each host can access some of the physical entities. To maximize the resources of the storage area network 15, the physical entities are partitioned among the hosts to minimize duplication of information gathering. For ease of analysis, system 10 converts the topology of the storage area network management system 100 to a graphical representation. In general, the storage area network 15 can be represented as a graph with storage area network nodes and hosts or data collection agents as vertices with the edges determined by their connectivity.

The graph, G, can be denoted as (V, E), where V is the set of vertices and E is the set of edges. In this particular domain, every element v in set V is either a member of A (the set of data collection agents or hosts) or N (the set of storage area network nodes). However, there does not exist an element v in V that is a member of both A and N. In addition, each member v in V also has a load function L(v) that denotes the cost of data collection at v.

Figure 2:
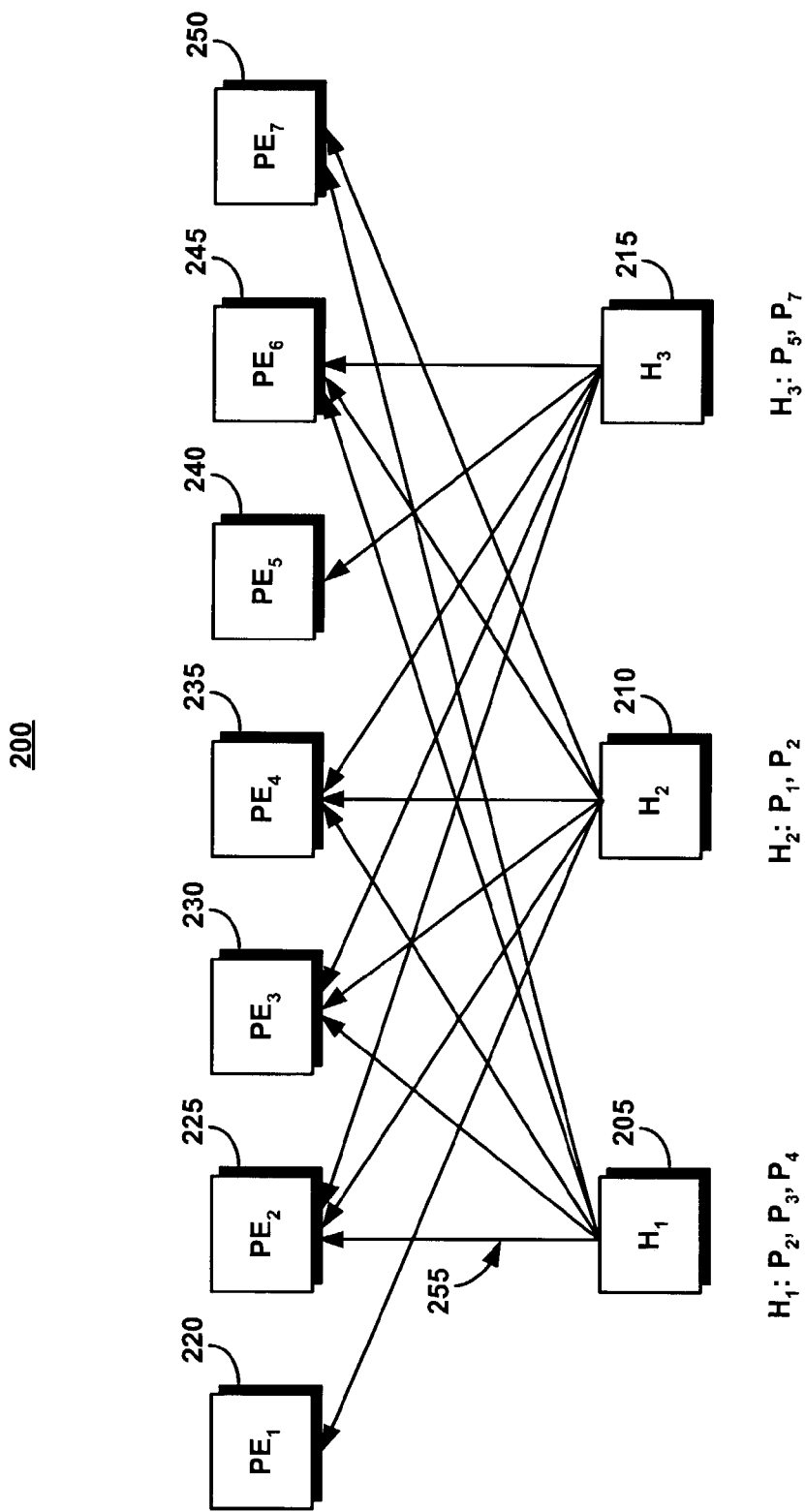
FIG. 2 is a block diagram representing an exemplary partitioning of the data collection agent assignment of FIG. 1.

More specifically and with reference to the exemplary architecture of FIG. 1, the storage area network 15 can be represented as graph 200 of FIG. 2. As the data collection agents reside on the host, the more general term of host may be used in addition to data collection agent to represent the functionality represented by the two entities. $Host_1$ 55 is represented in the graph as node $H_1$ 205, $host_2$ 60 is represented by node $H_2$ 210, and $host_3$ 65 is represented by node $H_3$ 215. The physical entities of FIG. 1: $PE_1$ 20, $PE_2$ 25, $PE_3$ 30, $PE_4$ 35, $PE_5$ 40, $PE_6$ 45, and $PE_7$ 50, are also converted to nodes: $PE_1$ 220, $PE_2$ 225, $PE_3$ 230, $PE_4$ 235, $PE_5$ 240, $PE_6$ 245, and $PE_7$ 250, respectively.

The connectivity of the arbitrated loops are represented by edges in the graph connecting host nodes to physical entities, such as edge 255 connecting node $H_1$ 205 to node $PE_2$ 225. Representing the connectivity of the arbitrated loop 85, node $H_1$ 205 can access nodes $PE_2$ 225, $PE_3$ 230, $PE_4$ 235, $PE_6$ 245, and $PE_7$ 250. Representing the connectivity of arbitrated loop 90, node $H_2$ 210 can access nodes $PE_1$ 220, $PE_2$ 225, $PE_3$ 230, $PE_4$ 235, $PE_6$ 245, and $PE_7$ 250. Representing the connectivity of arbitrated loop 95, node $H_3$ 215 can access nodes $PE_1$ 220, $PE_2$ 225, $PE_3$ 230, $PE_4$ 235, $PE_5$ 240, and $PE_6$ 245. System 10 partitions the graph G, 200, such that each node is assigned approximately the same load. Consequently, a load value is assigned to each physical entity. This load value represents the amount of data to be collected by a node from that physical entity.

Only node $H_2$ 210 is connected to node $PE_1$ 220, so system 10 assigns $PE_1$ 220 to $H_2$ 210. Similarly, only node $H_3$ 215 is connected to node $PE_5$ 240, so system 10 assigns $PE_5$ 240 to $H_3$ 215. Therefore, both $H_2$ 210 and $H_3$ 215 initially have a load of 1.

System 10 divides the remaining physical entity nodes, $PE_2$ 225, $PE_3$ 230, $PE_4$ 235, $PE_6$ 245, and $PE_7$ 250 among the three host nodes, $H_1$ 205, $H_2$ 210, and $H_3$ 215, such that the information gathering load of each node is approximately equal. The load division among the hosts is accomplished by using a known partitioning method that recursively partitioning the graph into equal node balanced parts. If the host has an assigned load, then that load is included in the initial load count for that host in addition to physical entities that only that host accesses.

Figure 3:
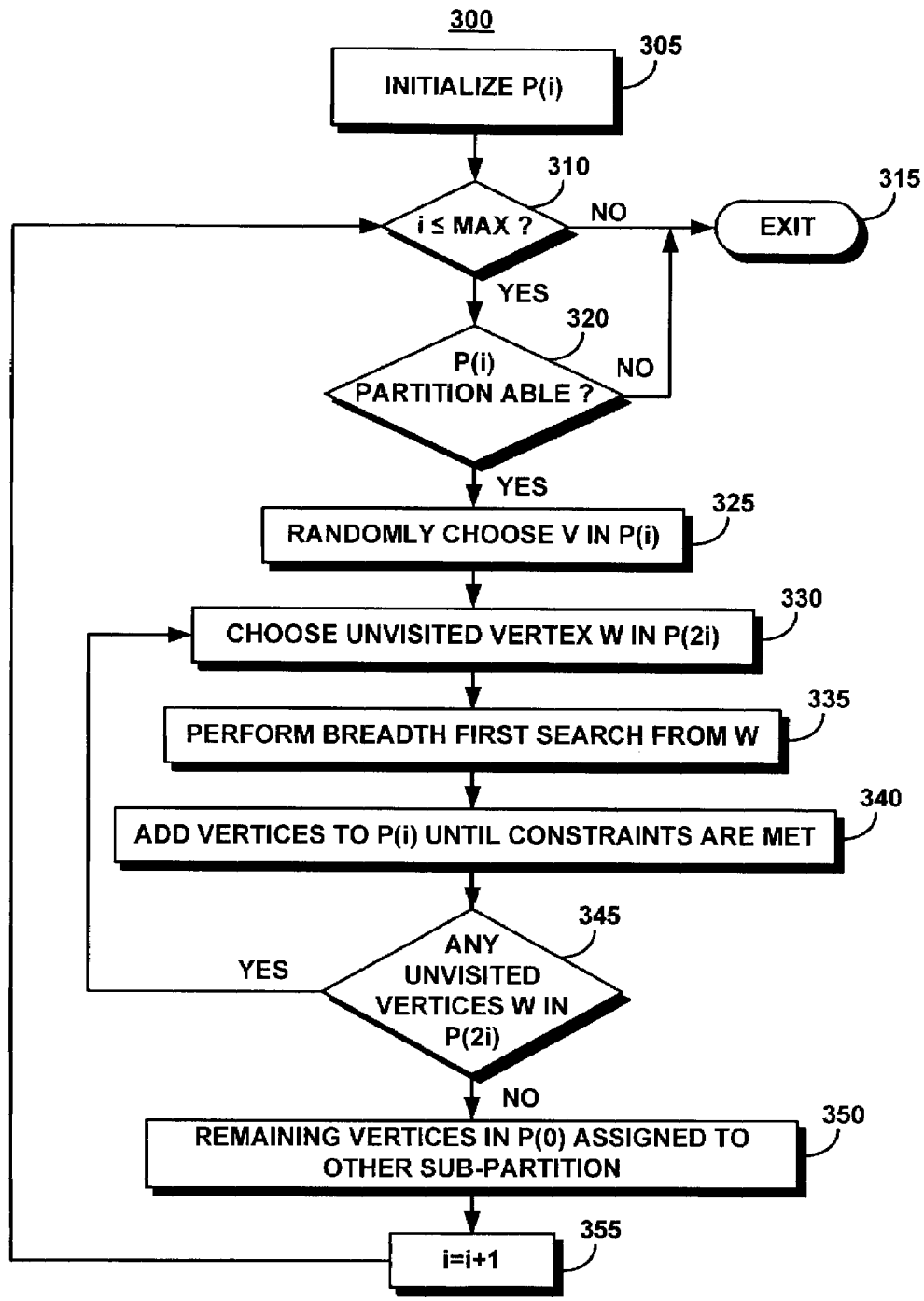
FIG. 3 is a process flow chart illustrating a method of operation of the data collection agent assignment system of FIGS. 1 and 2.

Method 300 of system 10 is illustrated by the process flow chart of FIG. 3. The set of partitions are denoted as P(i). At block 305, P(0) is initialized to the set V. The partition counter, i, is set to zero, and the maximum number of partitions created, max, is set to zero. For a partition P, Load(p) is the cumulative load of all vertices in P and Agent(p) is the number of data collection agent vertices or host vertices in P.

At block 310, system 10 verifies that the partition counter, i, is less than or equal to the maximum number of partitions created, max. If it is, system 10 proceeds to decision block 320, otherwise, it exits at block 315. The value for the maximum number of partitions created, max, changes as system 10 performs the partitioning process, until system 10 can no longer partition the vertices.

If method 300 determines, at decision block 320, that P(i) is no longer partitionable, system 10 exits at block 315. P(i) is not partitionable if it has only one data collection agent, or one physical entities.

If P(i) is determined at decision block 320 to be partitionable, system 10 partitions P(i) into two sub-partitions P(2i) and P(2i+1), such that each sub-partition contains approximately half the load and half the number of data collection agents of the original partition P(i), as follows. At block 325, system 10 selects a random vertex v in P(i) to be a member of the sub-partition P(2i). System 10 then chooses an unvisited vertex, w, in the other partition, P(2i) at block 330 which is connected to the vertex v. A breadth first search from the random vertex, w, is then performed at block 335. Vertices are added to the sub-partition, P(2i), along the search, until the two constraints of load and data collection agent count are satisfied simultaneously (block 340).

The constraints of load and data collection agent count are expressed as follows:

Load($P(2i)$)<Load($Pi$)/2;

Agents($P(2i)$)<Agents($P(i)$)/2;

System 10 selects random vertices and collects data collection agents and physical entities until these criteria are met. The process of blocks 330 through 340 are repeated until there remains no unvisited vertices w in P(2i), as determined at decision block 345.

The remaining vertices in P(i) are assigned to the other sub-partition of P(i) at block 350 which is denoted as P(2i+1), such that $P(2i+1)$=all vertices v in $P(i)$ but not in $P(2i)$.

Once this equation is satisfied, system 10 sets the value, max, to the largest partition created thus far, as follows:

max=$2i+1$.

The partition counter, i, is increased by 1 at block 355, and the partitioning process is iterated on the partition indicated by the partition counter till the partition counter exceeds the maximum number of partitions created.

In summary, the partition p(i) is divided into two sub-partitions, P(2i) and P(2i+1). The partition P(i) is thus expressed as follows:

$P(i) \rightarrow (P(2i)|P(2i+1))$ where $\Sigma L(v) \approx \Sigma L(v_i)$.

The vertex, v, of $\Sigma L(v)$ is in P(2i) and the vertex, $v_i$, of $\Sigma L(v_i)$ is in P(i)/2. In addition, $|v| \approx |v_i|/2$ where v is in P(2i) and A(v) and $v_i$ is in P(i) and A(v).

System 10 equitably distributes the data collection load among all the data collection agents A in the graph through the partitioning process. The distribution of the data collection load is determined by the topology of the graph and the starting random vertex w in each partitioning step. The analysis of the distribution provides a good approximation of the optimal assignment of data collection agents.

The intermediate partitioning steps provide information that can be used to deal with failure of data collection agents or storage area network nodes. A partition level L is defined such that L contains partitions "p" in $[P(2^{L-1}) \ldots P(2^L-1)]$ A level $L_{fail}$ is chosen such that $L_{fail}$ contains every element in $[P(2^{L_{fail}-1}) \ldots P(2^{L_{fail}}-1)]$ and every element in $L_{fail}$ has the minimum number of data collection points that satisfy the fail-safe criterion of a system administrator. Consequently, in the event a data collection agent "a" in a partition "p" in $L_{fail}$ suffers failure, alternate data collection agents in "p" can be chosen to collect information from the storage area network nodes managed by data collection agent "a". Similarly, in the event a data collection agent "a" does not report on a storage area network node n in partition "p", different data collection agents in the same partition "p" can be used to verify the storage area network "n".

Figure 4:
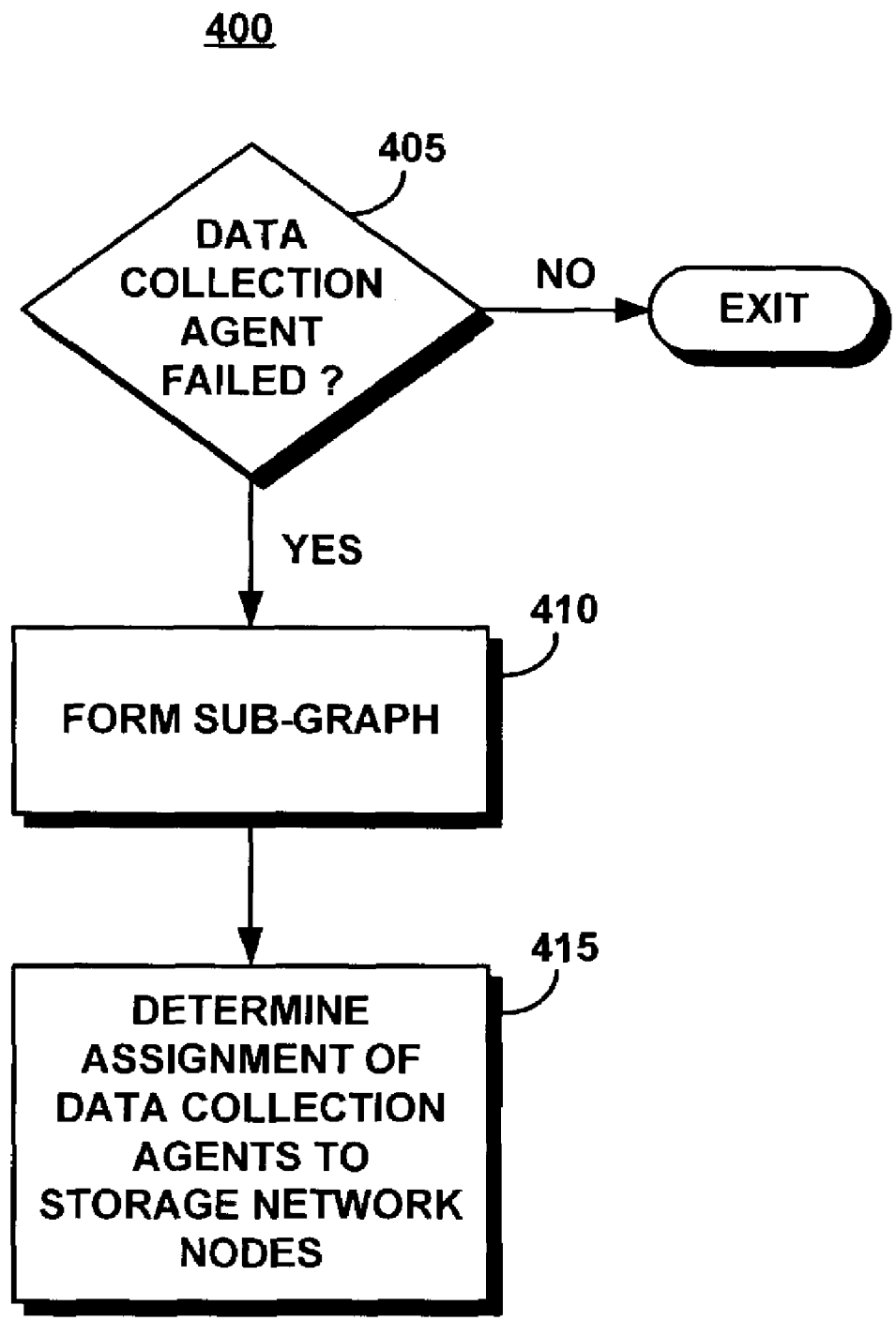
FIG. 4 is a process flow chart illustrating a method of operation of the data collection agent assignment system of FIGS. 1 and 2 when a data collection agent fails.

Method 400 of FIG. 4 is implemented by system 10 to provide fail-over protection. In the event of a failure by a data collection agent or host at block 405, system 10 uses the sub-graphs created in the partitioning of the physical entities among the hosts to form potentially larger sub-graphs. These sub-graphs have at least the minimum number of data collection agents in a system administrator's fail-safe criterion (block 410). System 10 then uses the largest sub-graphs to determine the assignments of physical entities to data collection agents or hosts at block 415.

It is to be understood that the specific embodiments of the invention that have been described are merely illustrative of certain application of the principle of the present invention. Numerous modifications may be made to the system and method for assigning data collection agents to storage area network nodes in a storage area network resource management system invention described herein without departing from the spirit and scope of the present invention.

What is claimed is:

1. In a storage area network, a processor-implemented method of allocating a load among a plurality of data collection agents, the method comprising:
representing the plurality of data collection agents using a first group of nodes;
representing a plurality of physical entities from which the plurality of data collection agents collect data using a second group of nodes;
generating a graph, G, wherein the first group of nodes are joined to the second group of nodes using a plurality of edges, each of the edges representing a connection between a data collection agent and a physical entity on the storage area network;
wherein G is denoted as (V, E), where V is a set of vertices of the graph and E is a set of the plurality of edges, and where each vertex element, v, in set V is either a member of A, which comprises the set of data collection agents represented by the first group of nodes, or a member of N, which comprises the set of physical entities represented by the second group of nodes such that there does not exist an element v in V that is a member of both A and N;
wherein each member v in V has a load function, L(v), that denotes the cost of data collection at V;
mathematically optimizing a correspondence between the first group of nodes and the second group of nodes, and allocating the load among a plurality of data collection agents represented by the first group of nodes, wherein the load comprises the plurality of physical entities from which the plurality of data collection agents collect data, and the load is allocated among the first group of nodes by:

partitioning the graph into a plurality of sub-graphs, (P(i)), wherein i represents a partition counter, each of the sub-graphs comprising a mutually exclusive subset of the first group of nodes;

iteratively partitioning the plurality of sub-graphs, P(i), into subpartitions, P(2i) and P(2i+1), and allocating the load into approximately balanced distributed loads among the first group of nodes until the following constraints of load and data collection agent are simultaneously satisfied:

$Load(P(2i)) < Load(Pi)/2$; and;

$Agents(P(2i)) < Agents(Pi)/2$ and;

determining whether a data collection agent has failed and using a largest sub-graph of the plurality of sub-graphs to reassign the load among the first group of nodes by using information from the iteratively partitioning, wherein a partition level, L, is defined such that L contains partitions in accordance with the following expression:

$[P(2^{L-1}) \ldots P(2^L-1)]$;

and a level $L_{fail}$ is chose such that $L_{fail}$ contains every element in $[P(2^{Lfail-1}) \ldots P(2^{Lfail}-1)]$, and every element in $L_{fail}$ has a minimum number of data collection points that satisfy a predetermined fail-safe criterion.

2. The method of claim 1, wherein the iteratively partitioning and allocating further comprises randomly selecting a vertex, v, in a first partition P(i), selecting an unvisited vertex, w, in a second partition P(2i), and performing a breadth first search from the unvisited vertex w selected in the second partition P(2i).

3. The method of claim 2, further comprising adding a plurality of vertices to the first partition P(i) until the constraints of load and data collection agent are simultaneously satisfied.

4. The method of claim 1, further comprising assigning a plurality of vertices in the graph to the second partition P(2i).

5. The method of claim 1, wherein in the event a given data collection agent, a, in a given partition, p, in $L_{fail}$ suffers a failure, one or more alternate data collection agents are available for selection within p to collect information from the physical entities managed by data collection agent a, and wherein in the event a given data collection agent, a, in a given partition, p, does not report on a given physical entity, n, in partition p, one or more alternate data collection agents in the same partition p are available to verify the physical entity n.

* * * * *